(12) United States Patent
Matsui et al.

(10) Patent No.: US 11,011,096 B2
(45) Date of Patent: May 18, 2021

(54) SELF-DIAGNOSTIC IMAGING METHOD, SELF-DIAGNOSTIC IMAGING PROGRAM, DISPLAY DEVICE, AND SELF-DIAGNOSTIC IMAGING SYSTEM

(71) Applicant: NEC Display Solutions, Ltd., Tokyo (JP)

(72) Inventors: Katsuyuki Matsui, Tokyo (JP); Kiyomichi Fukushima, Tokyo (JP)

(73) Assignee: Sharp NEC Display Solutions, Ltd., Tokyo (JP)

( * ) Notice: Subject to any disclaimer, the term of this patent is extended or adjusted under 35 U.S.C. 154(b) by 20 days.

(21) Appl. No.: 16/324,507

(22) PCT Filed: Aug. 25, 2016

(86) PCT No.: PCT/JP2016/074779
§ 371 (c)(1),
(2) Date: Feb. 8, 2019

(87) PCT Pub. No.: WO2018/037525
PCT Pub. Date: Mar. 1, 2018

(65) Prior Publication Data
US 2019/0172383 A1 Jun. 6, 2019

(51) Int. Cl.
*G09G 3/20* (2006.01)
*G09G 3/00* (2006.01)
(Continued)

(52) U.S. Cl.
CPC .......... *G09G 3/2003* (2013.01); *G09G 3/006* (2013.01); *H04N 17/04* (2013.01); *G09G 3/3607* (2013.01);
(Continued)

(58) Field of Classification Search
CPC ..... G09G 2300/0421; G09G 2300/043; G09G 2300/0426; G09G 2320/045
See application file for complete search history.

(56) References Cited

U.S. PATENT DOCUMENTS

| 5,670,972 A * | 9/1997 | Kim | ................... G01R 31/2825 |
| | | | 345/12 |
| 2003/0138152 A1* | 7/2003 | Fenney | ................ H04N 1/3935 |
| | | | 382/240 |

(Continued)

FOREIGN PATENT DOCUMENTS

| JP | H 08-227069 A | 9/1996 |
| JP | 2956520 B | 10/1999 |

(Continued)

OTHER PUBLICATIONS

International Search Report (ISR) (PCT Form PCT/ISA/210), in PCT/JP2016/074779, dated Nov. 8, 2016.

*Primary Examiner* — William Lu
(74) *Attorney, Agent, or Firm* — McGinn I.P. Law Group, PLLC.

(57) ABSTRACT

A display device is for displaying an image generated by an image processing device. The display device includes: a video decoding and input unit that receives an encoded image of a reference signal generated by the image processing device, and decodes the encoded image; a video display unit that performs image quality correction of the decoded image and displays, on a display panel, the image to which the image quality correction has been performed; and an image cut-out unit that cuts out an image at a position corresponding to the reference signal from an image to which the image quality correction has not been performed and transmits the cut out image to which the image quality correction has been performed, to the image processing device.

20 Claims, 7 Drawing Sheets

(51) Int. Cl.
*H04N 17/04* (2006.01)
*G09G 5/02* (2006.01)
*G09G 3/36* (2006.01)

(52) U.S. Cl.
CPC ........... *G09G 5/02* (2013.01); *G09G 2340/06* (2013.01); *G09G 2360/18* (2013.01); *G09G 2370/12* (2013.01)

(56) References Cited

U.S. PATENT DOCUMENTS

| | | | | |
|---|---|---|---|---|
| 2004/0027363 A1* | 2/2004 | Allen | ................ | G09G 3/007 345/698 |
| 2004/0189565 A1* | 9/2004 | Someya | ................ | G09G 3/3611 345/87 |
| 2004/0207386 A1* | 10/2004 | Durr | ................ | H04N 17/002 324/121 R |
| 2005/0195163 A1* | 9/2005 | Grewal | ................ | G06F 3/0317 345/157 |
| 2005/0195216 A1* | 9/2005 | Kramer | ................ | G09G 3/003 345/619 |
| 2005/0206784 A1* | 9/2005 | Li | ................ | H04N 19/61 348/441 |
| 2007/0071333 A1* | 3/2007 | Strom | ................ | H04N 19/154 382/239 |
| 2008/0101468 A1* | 5/2008 | Ishikawa | ................ | H04N 17/004 375/240.12 |
| 2008/0117308 A1* | 5/2008 | Sa | ................ | H04N 9/735 348/223.1 |
| 2008/0192061 A1* | 8/2008 | Lim | ................ | H04N 21/44004 345/558 |
| 2009/0003692 A1* | 1/2009 | Pettersson | ................ | G06T 9/005 382/166 |
| 2009/0174791 A1* | 7/2009 | Ikeyama | ................ | H04N 9/73 348/223.1 |
| 2009/0257651 A1* | 10/2009 | Ries | ................ | G09G 5/04 382/166 |
| 2011/0049374 A1* | 3/2011 | Omi | ................ | G09G 3/006 250/370.08 |
| 2011/0150280 A1* | 6/2011 | Tsuji | ................ | G06T 7/248 382/103 |
| 2011/0150330 A1* | 6/2011 | Jannard | ................ | H04N 19/63 382/166 |
| 2011/0187891 A1* | 8/2011 | Zhang | ................ | H04N 9/73 348/223.1 |
| 2011/0254822 A1* | 10/2011 | Anzai | ................ | G09G 3/3688 345/211 |
| 2012/0268465 A1* | 10/2012 | Inada | ................ | G11B 27/329 345/428 |
| 2013/0142266 A1* | 6/2013 | Strom | ................ | H03M 7/30 375/240.16 |
| 2013/0272606 A1* | 10/2013 | Nakamura | ................ | G06T 7/90 382/167 |
| 2013/0307866 A1* | 11/2013 | Arai | ................ | G09G 5/003 345/594 |
| 2014/0146098 A1* | 5/2014 | Furihata | ................ | G09G 3/2092 345/694 |
| 2014/0172964 A1* | 6/2014 | Lyons | ................ | G09G 5/39 709/203 |
| 2015/0199934 A1* | 7/2015 | Kimura | ................ | G01J 3/506 345/690 |
| 2015/0379684 A1* | 12/2015 | Ramani | ................ | G06K 9/527 345/531 |
| 2016/0035072 A1* | 2/2016 | Qian | ................ | G06F 3/1446 382/164 |
| 2016/0055628 A1* | 2/2016 | Hayashi | ................ | G06T 5/003 382/254 |
| 2016/0055778 A1* | 2/2016 | Kim | ................ | G09G 3/2003 345/618 |
| 2016/0189399 A1* | 6/2016 | Liu | ................ | G09G 5/02 345/591 |
| 2016/0198174 A1* | 7/2016 | Mochizuki | ................ | H04N 19/44 375/240.27 |
| 2019/0304350 A1* | 10/2019 | Siu | ................ | G01R 31/2825 |

FOREIGN PATENT DOCUMENTS

| | | |
|---|---|---|
| JP | 2003-087589 A | 3/2003 |
| JP | 2005-189582 A | 7/2005 |
| JP | 2005-204048 A | 7/2005 |

\* cited by examiner

SELF-DIAGNOSTIC IMAGING METHOD, SELF-DIAGNOSTIC IMAGING PROGRAM, DISPLAY DEVICE, AND SELF-DIAGNOSTIC IMAGING SYSTEM

TECHNICAL FIELD

The present invention relates to a self-diagnostic imaging method, a self-diagnostic imaging program, a display device, and a self-diagnostic imaging system.

BACKGROUND ART

Consistent color reproduction based on a standard is required in image handling tasks such as medical care and graphic design. Consequently, it is necessary for video data to be transmitted without change or loss in the transmission path, from the image display application of the personal computer to the display that displays the image. The transmission path mentioned here not only includes electric communication units such as DVI (Digital Visual Interface) and HDMI (registered trademark) (High-Definition Multimedia Interface), but also data processing units such as the color management processing of an operating system.

On the other hand, as a general rule the transmission path supports various video formats. That is to say, in order to support various applications and connected equipment (AV equipment, broadcasting equipment, personal computers, mobile equipment, and the like), a procedure is performed in which the transmission side (for example, a personal computer) encodes the video according to the receiver characteristics (for example, a display), and the receiver that receives the signal decodes the video according to the transmission side characteristics. Here, as the number of video formats supported by the equipment increases, the number of setting parameters accompanying the processing also increases. As a result, image quality deterioration such as color shifts caused by an erroneous setting (hereunder, a signal change before and after transmission is collectively referred to as image quality deterioration) more readily occurs. However, even if image quality deterioration occurs in this manner due to an erroneous setting of the display environment, it is difficult for the user to know whether or not the image quality deterioration is due to an erroneous setting of the display environment, or due to a malfunction of the equipment and the like. Consequently, when the color of a display image of a diagnostic image received by email and the like is not appropriate, it can sometimes be unknown whether or not the color is the color of the original image or is a result of an erroneous setting of the display environment.

Proposed in Patent Document 1 is a technique that performs color diagnosis of a display of a personal computer. Furthermore, disclosed in Patent Document 2 is a technique that enables quantitative evaluation to be performed without being influenced by the experience or senses of a user when adjusting a profile.

PRIOR ART DOCUMENTS

Patent Documents

[Patent Document 1] Japanese Patent No. 2,956,520
[Patent Document 2] Japanese Unexamined Patent Application, First Publication No. 2003-087589

SUMMARY OF THE INVENTION

Problem to be Solved by the Invention

As mentioned above, image quality deterioration due to an erroneous setting of the display environment more readily occurs as the number of video formats supported by the equipment increases. However, if image quality deterioration of the display occurs, it is difficult to distinguish whether or not the image quality deterioration has occurred due to an erroneous setting of the display environment, or has occurred due to a malfunction of the equipment and the like.

In view of the problems mentioned above, an object of the present invention is to provide a self-diagnostic imaging method, a self-diagnostic imaging program, a display device, and a self-diagnostic imaging system that distinguish between a color diagnosis caused by an erroneous setting of the display environment and a color diagnosis caused by a malfunction of the equipment and the like.

Means for Solving the Problem

In order to solve the problems mentioned above, a self-diagnostic imaging method according to one exemplary aspect of the present invention is a self-diagnostic imaging method for a self-diagnostic imaging system including an image processing device that generates a display image and a display device that displays the image generated by the image processing device, the method includes: a step in which the image processing device generates an image of a reference signal, and encodes and outputs the image of the reference signal; a step in which the display device decodes an input video signal, performs image quality correction of the decoded image and displays it on a display panel, and cuts out an image at a position corresponding to the reference signal from an image not yet subjected to the image quality correction and transmits it to the image processing device; and a step in which the image processing device performs image diagnosis by comparing the image returned from the display device with the image of the reference signal.

A self-diagnostic imaging program according to one exemplary aspect of the present invention is a self-diagnostic imaging program for a self-diagnostic imaging system, the self-diagnostic imaging system comprising an image processing device that generates a display image and a display device that displays an image generated by the image processing device, and the program includes: a step in which the image processing device generates an image of a reference signal, and encodes and outputs the image of the reference signal; a step in which the display device decodes an input video signal, performs image quality correction of the decoded image and displays it on a display panel, and cuts out an image at a position corresponding to the reference signal from an image not yet subjected to the image quality correction and transmits it to the image processing device; and a step in which the image processing device performs image diagnosis by comparing the image returned from the display device with the image of the reference signal.

A display device according to one exemplary aspect of the present invention is a display device for displaying an image generated by an image processing device, and the display device includes: a video decoding and input unit that receives input of an encoded image of a reference signal generated by the image processing device, and decodes an input video signal; a video display unit that performs image quality correction of the decoded image and displays it on a display panel; and an image cut-out unit that cuts out an image at a position corresponding to the reference signal from an image not yet subjected to the image quality correction and transmits it to the image processing device.

A self-diagnostic imaging system according to one exemplary aspect of the present invention is a self-diagnostic imaging system including an image processing device that generates a display image, and a display device that displays an image generated by the image processing device, the image processing device includes a reference signal rendering unit that generates an image of a reference signal, a video encoding and output unit that encodes and outputs an image of the reference signal; and an input and output comparison unit that compares an image returned from the display device with the image generated by the reference signal rendering unit, and the display device includes a video decoding and input unit that decodes an input video signal, a video display unit that performs image quality correction of the decoded image and displays it on a display panel, and an image cut-out unit that cuts out an image at a position corresponding to the reference signal from an image not yet subjected to image quality correction and transmits it to the image processing device.

Effect of the Invention

According to the present invention, by comparing an image returned from a display device and an image generated by a reference signal rendering unit, it can be determined whether or not there is an erroneous setting of the display environment. In particular, it is possible to detect a color shift due to a combination of image data transmission and reception equipment.

EMBODIMENTS FOR CARRYING OUT THE INVENTION

Hereunder, an exemplary embodiment of the present invention will be described with reference to the drawings.

Figure 1:
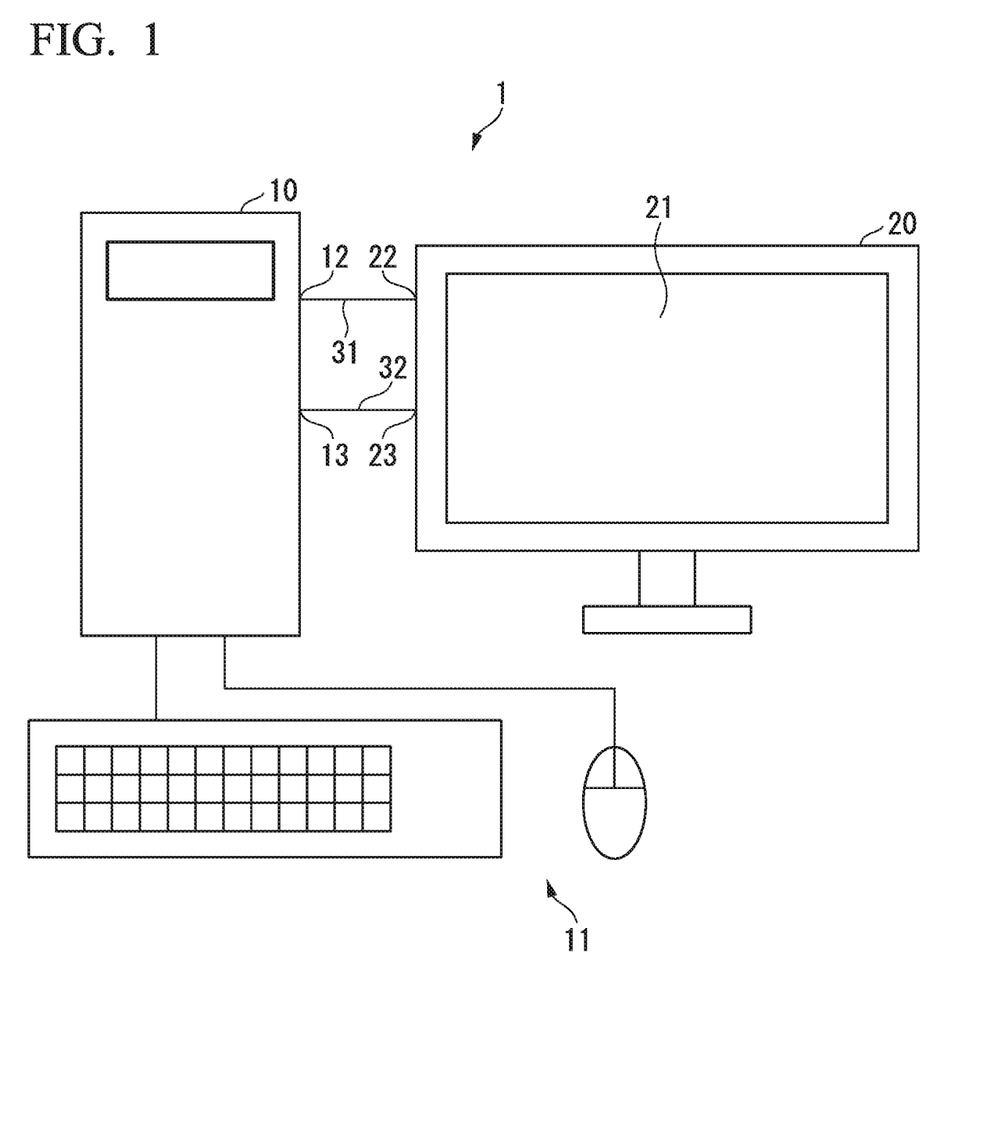
FIG. 1 is a block diagram showing an outline of a self-diagnostic imaging system according to a first exemplary embodiment of the present invention.

FIG. 1 shows an outline of a display system 1 (self-diagnostic imaging system) according to a first exemplary embodiment of the present invention.

In FIG. 1, an image processing device 10 is a device that outputs a display image. Here, it is a personal computer for example. The image processing device 10 includes a CPU (Central Processing Unit), a RAM (Random Access Memory), a ROM (Read Only Memory), a storage device such as an HDD (Hard Disk Drive), a video card for video output, and the like. Furthermore, an input device 11 such as a keyboard or a mouse is connected to the image processing device 10. The image processing device 10 includes a video output terminal 12 such as an HDMI (High-Definition Multimedia Interface) and a connection terminal 13 such as a USB (Universal Serial Bus). Moreover, the image processing device 10 operates based on an operating system and application programs. Here, although the image processing device 10 is assumed to be a personal computer, the image processing device 10 may also represent AV equipment, broadcasting equipment, mobile equipment, and the like.

The display device 20 displays an image that is output from the image processing device 10. The display device 20 includes a display panel 21 comprising an LCD (Liquid Crystal Display) for example. Furthermore, the display device 20 is provided with a video input terminal 22 such as an HDMI (High-Definition Multimedia Interface), and a connection terminal 23 such as a USB (Universal Serial Bus).

As shown in FIG. 1, the video output terminal 12 of the image processing device 10 and the video input terminal 22 of the display device 20 are connected by an HDMI cable 31. Furthermore, the connection terminal 13 of the image processing device 10 and the connection terminal 23 of the display device 20 are connected by a USB cable 32. In this example, although the image processing device 10 and the display device 20 are connected by the HDMI cable 31, the image interface is in no way limited to this. The image interface may also use a DVI (Digital Visual Interface). Moreover, in this example, although the image processing device 10 and the display device 20 are connected by the USB cable 32, the interface that transmits and receives the data is in no way limited to this.

The display system 1 according to the first exemplary embodiment of the present invention has a diagnostic function for checking color display characteristics. Specifically, when designated software is activated, the image processing device 10 transmits reference signal image data to the display device 20 via the HDMI cable 31. Here, the image processing device 10 encodes RGB (red, green, blue) image data into YCrCb (luminance, blue color difference, red color difference) image data in compliance with the HDMI standard, and then transmits the data. The display device 20 receives the reference signal data. Here, the display device 20 decodes the received YCrCb image data into RGB image data in compliance with the HDMI standard. Then, the display device 20 performs image quality correction of the received reference signal image data, and displays the image on the display panel 21. Furthermore, the display device 20 sends pixel information for a portion of the image data not yet subjected to image quality correction back to the image processing device 10 via the USB cable 32.

The image processing device 10 determines the color characteristics by comparing the pixel information of the reference signal RGB image generated by the designated software and the pixel information of the RGB image sent back from the display device 20. Then, if the pixel information of the reference signal RGB image generated by the designated software is different from the pixel information of the RGB image sent back from the display device 20, the image processing device 10 determines that an abnormality has occurred.

Next, details of the color diagnostic function in the display system 1 according to the first exemplary embodiment of the present invention will be described.

Figure 2:
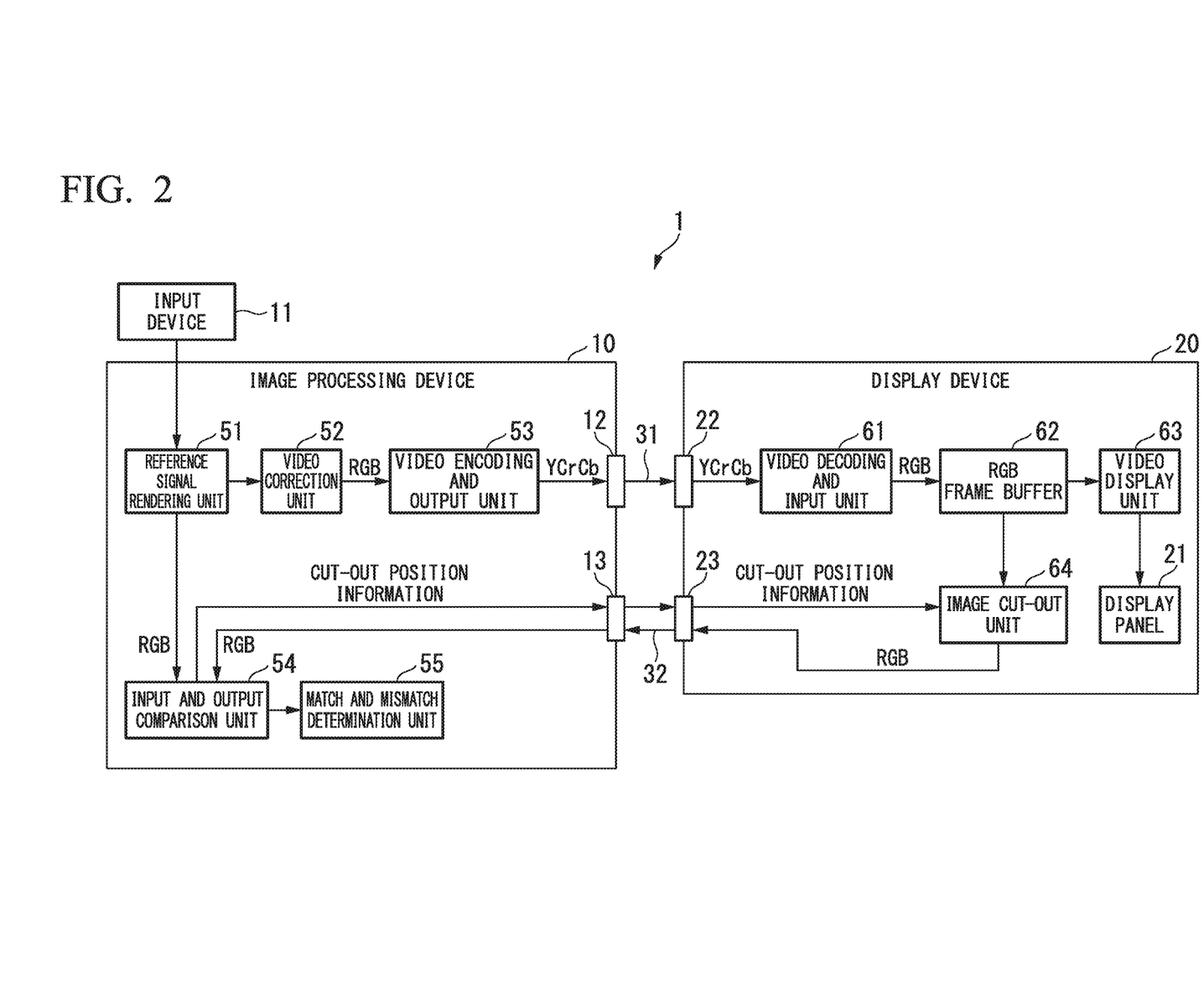
FIG. 2 is a functional block diagram showing a configuration of the self-diagnostic imaging system according to the first exemplary embodiment of the present invention.

FIG. 2 shows the configuration of the display system 1 according to the first exemplary embodiment of the present invention as a functional block diagram. As shown in FIG. 2, the image processing device 10 includes a reference signal rendering unit 51, a video correction unit 52, a video encoding and output unit 53, an input and output comparison unit 54, and a match and mismatch determination unit 55.

The reference signal rendering unit 51 represents software for performing color diagnosis that generates a reference signal RGB image. The video correction unit 52 places the RGB image to be rendered inside the screen displayed on the display. Specifically, the video correction unit 52 is a part that performs video processing using an operating system or a video card. The video encoding and output unit 53 encodes the RGB image to be rendered into a video signal compatible with the transmission path, and outputs the signal from the video output terminal 12.

The input and output comparison unit 54 receives an RGB image from the display device 20, and compares the reference signal RGB image from the reference signal rendering unit 51 and the RGB image received from the display device 20 one pixel at a time. Furthermore, the input and output comparison unit 54 transmits image cut-out information (xy coordinates) to the display device 20. The match and mismatch determination unit 55 presents to the user whether or not the comparison result in the input and output comparison unit 54 represents a match.

The display device 20 includes a video decoding and input unit 61, an RGB frame buffer 62, a video display unit 63, an image cut-out unit 64, and a display panel 21.

The Video decoding and input unit 61 receives a video signal compatible with HDMI from the video input terminal 22, and decodes the RGB image from the input video signal. The RGB frame buffer 62 temporarily holds the RGB image decoded by the video decoding and input unit 61. The RGB frame buffer 62 is generally used for adjustment of the display timing and as a reference during image quality correction. The video display unit 63 receives the video signal after decoding into RGB, performs image quality correction, and displays the image on the display panel 21.

The image cut-out unit 64 cuts out RGB image data from inside the RGB frame buffer 62 based on image cut-out position information from the image processing device 10, and transmits the RGB image data that has been cut out to the image processing device 10. The image data not yet subjected to image quality correction is saved in the RGB frame buffer 62.

Figure 3:
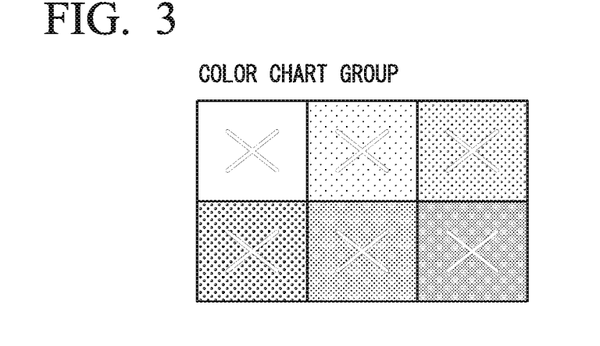
FIG. 3 is an explanatory diagram of a color chart group.

In FIG. 2, the reference signal rendering unit 51 presents to the user a color chart group (color chart) as shown in FIG. 3 as an inspection target candidate. The color chart group may represent known content according to a standard or the like, or a color occurring with a high frequency may be extracted from an image group selected by the user.

The reference signal rendering unit 51 outputs an RGB image whose color chart group is vertically and horizontally aligned as an image of a reference signal to the video correction unit 52. The video correction unit 52 places the color chart group on the screen and outputs it to the video encoding and output unit 53.

The video encoding and output unit 53 encodes the RGB image to be rendered into a video signal compatible with the transmission path, and outputs the signal from the video output terminal 12. Specifically, the video encoding and output unit 53 encodes the RGB image into a YCbCr (luminance, blue difference, and red difference) image and outputs it to the video output terminal 12.

The video decoding and input unit 61 of the display device 20 receives the video signal from the image processing device 10 and decodes it up to an uncompressed RGB image of the same format as the color chart of the reference signal. That is to say, the video decoding and input unit 61 decodes the uncompressed RGB image from a video signal that is input as a YCbCr image. Then, the video decoding and input unit 61 writes the equivalent of one screen of RGB image data into the RGB frame buffer 62.

The video display unit 63 applies to the image data of the RGB frame buffer 62, an image quality correction that is dependent on the characteristics of the display panel, and then displays the image on the display panel 21. Here, the video display unit 63 is capable of performing an image quality correction that is dependent on the characteristics of the display panel (for example, 6-axis color correction and screen unevenness correction).

Furthermore, the reference signal rendering unit 51 of the image processing device 10 calculates the vertical and horizontal coordinates for inside the screen that contains the color chart group. Then, the reference signal rendering unit 51 transmits the vertical and horizontal coordinates for inside the screen that contains the color chart group, and the RGB image of the selected color chart group, to the input and output comparison unit 54.

The input and output comparison unit 54 transmits the vertical and horizontal coordinates for inside the screen that contains the color chart group to the display device 20 as the cut-out position information. Here, rendering of the color chart group may be performed by the image display software primarily used by the user. This is because the image quality correction operation of the operating system may be different for each software. In this case, since the display position and the size of the color chart vary depending on the operation of the user, it is difficult to detect and estimate the cut-out position information using the display device 20. In this case, it is possible to substitute this function by displaying a position guide marker and the like on the screen, that indicates the recommended display position (near the center, for example), and prompting the user to adjust the display position of the color chart group. Furthermore, the image of the color chart group transmitted from the reference signal rendering unit 51 to the input and output comparison unit 54 is conveniently an RGB gradation, but may be an XYZ value or a Lab value converted to a perceived color. If an XYZ value or a Lab value converted to a perceived color is used, an enhanced inspection quality can be anticipated.

Figure 4:
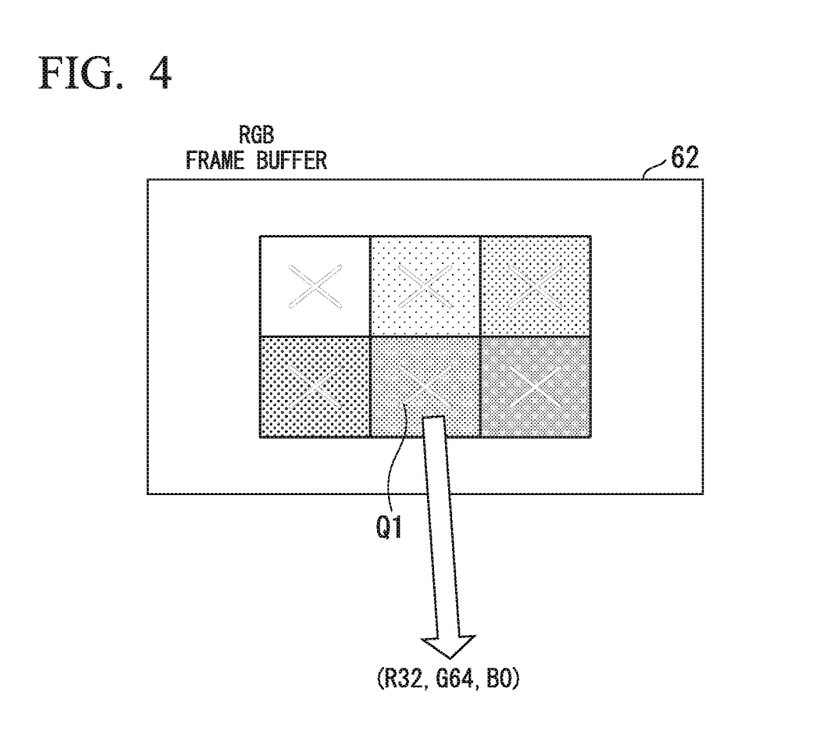
FIG. 4 is an explanatory diagram of an image cut-out position in the self-diagnostic imaging system according to the first exemplary embodiment of the present invention.

Upon receiving the image cut-out position information, the image cut-out unit 64 of the display device 20 reads the RGB image inside the RGB frame buffer 62 based on the image cut-out position information. Here, the RGB image stored in the RGB frame buffer 62 does not include the correction characteristics in the video display unit 63. The image cut-out unit 64 cuts out an RGB image from the RGB frame buffer 62 at the position corresponding to the color chart group based on the image cut-out position information, and transmits the RGB image that has been cut out to the image processing device 10. For example, as shown in FIG. 4, it is assumed that an RGB image of the color chart group is stored inside the RGB frame buffer 62, and the cut-out position is represented by Q1. In this case, as shown in FIG. 4, the gradation of the RGB image pixels at the cut-out position Q1, for example (R32, G64, B0), is read from the RGB frame buffer 62, and the RGB image information is transmitted to the image processing device 10.

The input and output comparison unit 54 of the image processing device 10 compares the pixel information of the reference signal RGB image generated by the designated software of the reference signal rendering unit 51 and the pixel information of the RGB image sent back from the display device 20 one pixel at a time. Then, the match and mismatch determination unit 55 performs image diagnosis based on the comparison result, and presents it to the user.

Here, because the RGB image stored in the RGB frame buffer 62 does not include the correction characteristics in the video display unit 63, if there are no setting errors in the video correction unit 52 and the video encoding and output unit 53 on the image processing device 10 side, and the video decoding and input unit 61 and the like on the display device 20 side, the pixels of the reference signal RGB image generated by the reference signal rendering unit 51 are expected to match the pixels of the RGB image sent back from the display device 20. Furthermore, even if no setting errors exist, if there is a problem in the image quality correction by the video display unit 63, a color shift occurs in the image displayed on the display panel 21.

If the pixels of the reference signal RGB image generated by the reference signal rendering unit 51 and the pixels of the RGB image sent back from the display device 20 do not match, it can be determined that there is a setting error in the video correction unit 52 or the video encoding and output unit 53 on the image processing device 10 side, or the video decoding and input unit 61 and the like on the display device 20 side. Furthermore, if the pixels of the reference signal RGB image generated by the reference signal rendering unit 51 and the pixels of the RGB image sent back from the display device 20 match, but the color chart group generated as the reference signal is not correctly displayed on the display panel 21, it can be determined that the system is operating normally and that there is an erroneous setting of the display environment (erroneous setting of the video display unit 63). In view of the limits of human recognition and the like, a fixed tolerance value (error) may be used in the match determination.

In this example, the image cut-out position information that is transmitted from the image processing device 10 to the display device 20, and the RGB image data that is returned from the display device 20 to the image processing device 10 are transmitted and received via a USB. However, an interface other than a USB may be used. In this case, it is preferable to use an interface that is capable of performing bidirectional communication such as a USB. Moreover the image returned from the display device 20 to the image processing device 10 is conveniently an RGB gradation, but may be an XYZ value or a Lab value converted to a perceived color. If an XYZ value or a Lab value converted to a perceived color is used, an enhanced inspection quality can be anticipated.

Figure 5:
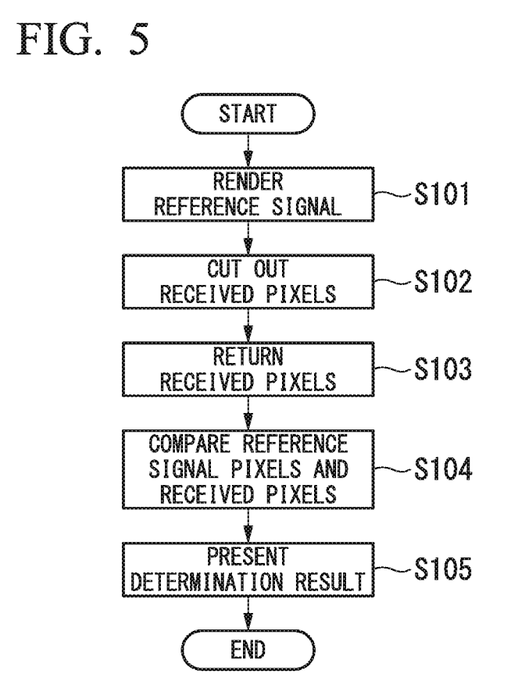
FIG. 5 is a flowchart showing an operation of a color diagnostic function in the self-diagnostic imaging system according to the first exemplary embodiment of the present invention.

FIG. 5 is a flowchart showing an operation of a color diagnostic function in the display system 1 according to the first exemplary embodiment of the present invention.

(Step S101) The image processing device 10 generates and encodes a reference signal, and transmits the signal to the display device 20. The display device 20 receives the reference signal from the image processing device 10. Further, the display device 20 performs decoding in the video decoding and input unit 61 up to an uncompressed RGB image having the same format as the color chart of the reference signal, applies an image quality correction in the video display unit 63, and then displays the image of the reference signal on the display panel 21.

(Step S102) Furthermore, the display device 20 saves the RGB image of the image not yet subjected to correction, inside the RGB frame buffer 62. The image cut-out unit 64 receives the image cut-out position information transmitted from the image processing device 10, and reads the RGB image inside the RGB frame buffer 62, based on the position information thereof.

(Step S103) Next, the image cut-out unit 64 returns the RGB image data read from the RGB frame buffer 62 to the image processing device 10 via the USB connection terminal 23.

(Step S104) The input and output comparison unit 54 compares the gradation of the RGB image received from the display device 20 and the gradation of the reference signal RGB image from the reference signal rendering unit 51 one pixel at a time.

(Step S105) The match and mismatch determination unit 55 presents to the user whether or not the comparison result represents a match. From this comparison result, if image quality deterioration exists in the image displayed on the display panel 21, it can be determined whether or not the image quality deterioration has occurred due to an erroneous setting of the display environment, or has occurred due to an equipment malfunction and the like.

As described above, in the first exemplary embodiment of the present invention, the image processing device 10 transmits a reference signal to the display device 20, cuts out a portion of the pixel information of the image of the reference signal received by the display device 20, and sends the information back to the image processing device 10. Then, the image processing device 10 compares the pixel information of the reference signal sent back by the display device 20 and the pixel information generated by the designated software to determine the color characteristics. The image data sent back from the display device 20 represents the image not yet subjected to image quality correction. Consequently, even if there is an abnormality in the image color displayed on the display panel 21, it can be determined that the change in the color is due to the image correction inside the display device 20 as long as the pixels of the reference signal sent back by the display device 20 match the pixels generated by the designated software. Furthermore, if the pixels of the reference signal sent back by the display device 20 do not match the pixel information generated by the designated software, it can be determined that a malfunction has occurred in the video card of the image processing device 10, the image input unit of the display device 20, and the like.

Furthermore, in the present exemplary embodiment, it is determined whether or not the overall characteristics of the transmitting side and the receiving side are appropriate. Moreover, since the color received by the display device 20 that performs the display is extracted and inspected, in principle, a color shift arising from differences in equipment characteristics between the display time and the inspection time does not occur. In addition, in the present exemplary embodiment, it is possible to detect a color shift arising from the combination of transmission and reception equipment. In the present exemplary embodiment, rather than an inspection using known test patterns, the user can arbitrarily select the color arrangement of the reference signal. Consequently, the inspection can be performed with characteristics close to the application, and inspection results can be obtained that are close to the experience of the user. Furthermore, in the present exemplary embodiment, since the inspection is completed by digital processing, it is possible to perform high-precision and high-speed inspection at low cost, and it is not necessary to perform adjustment inspections and the like using an optical sensor.

Second Exemplary Embodiment

Figure 6:
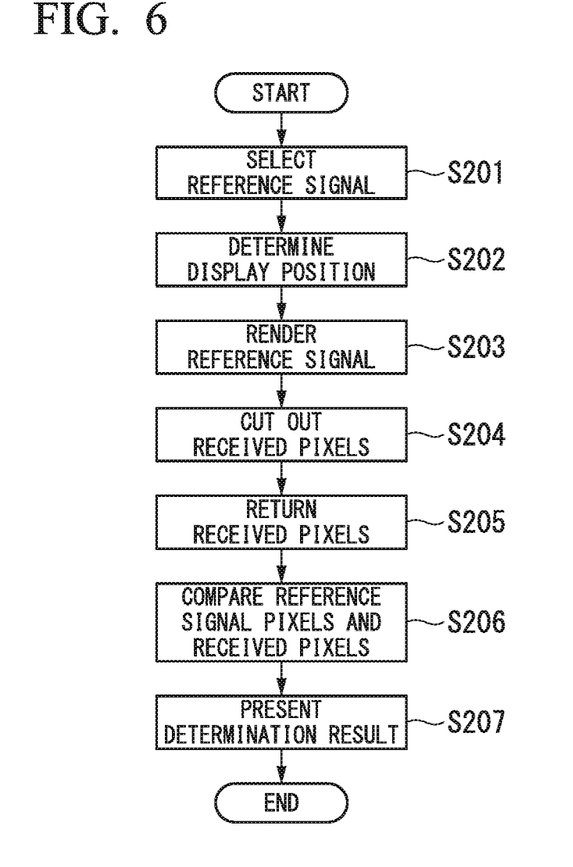
FIG. 6 is a flowchart showing an operation of a color diagnostic function in a self-diagnostic imaging system according to a second exemplary embodiment of the present invention.

Next, a second exemplary embodiment of the present invention will be described. FIG. 6 is a flowchart showing an operation of a color diagnostic function in a self-diagnostic imaging system according to a second exemplary embodiment of the present invention. In this exemplary embodiment, the user can select a color chart group. The basic configuration of the second exemplary embodiment of the present invention is the same as that of the first exemplary embodiment mentioned above.

(Step S201) Firstly, the reference signal rendering unit 51 presents to the user a color chart group (color chart) as an inspection target candidate, and the user uses the color chart group as the inspection target candidate to select a reference signal.

(Step S202) Then, the reference signal rendering unit 51 determines the vertical and horizontal coordinates inside the screen that contains the color chart group.

(Step S203) The display device 20 receives the reference signal from the image processing device 10. Then, the display device 20 performs decoding in the video decoding and input unit 61 up to an uncompressed RGB image having the same format as the color chart of the reference signal, applies an image quality correction in the video display unit 63, and then displays the image of the reference signal on the display panel 21.

(Step S204) Furthermore, the display device 20 saves the RGB image of the image not yet subjected to correction, inside the RGB frame buffer 62. The image cut-out unit 64 receives the image cut-out position information transmitted from the image processing device 10, and reads the RGB image inside the RGB frame buffer 62, based on the position information thereof.

(Step S205) Next, the image cut-out unit 64 returns the RGB image data read from the RGB frame buffer 62 to the image processing device 10 via the USB connection terminal 23.

(Step S206) The input and output comparison unit 54 compares the gradation of the RGB image received from the display device 20 and the gradation of the reference signal RGB image from the reference signal rendering unit 51 one pixel at a time.

(Step S207) The match and mismatch determination unit 55 presents to the user whether or not the comparison result represents a match. From this comparison result, if image quality deterioration exists in the image displayed on the display panel 21, it can be determined whether or not the image quality deterioration has occurred due to an erroneous setting of the display environment, or has occurred due to an equipment malfunction and the like.

Third Exemplary Embodiment

Figure 7:
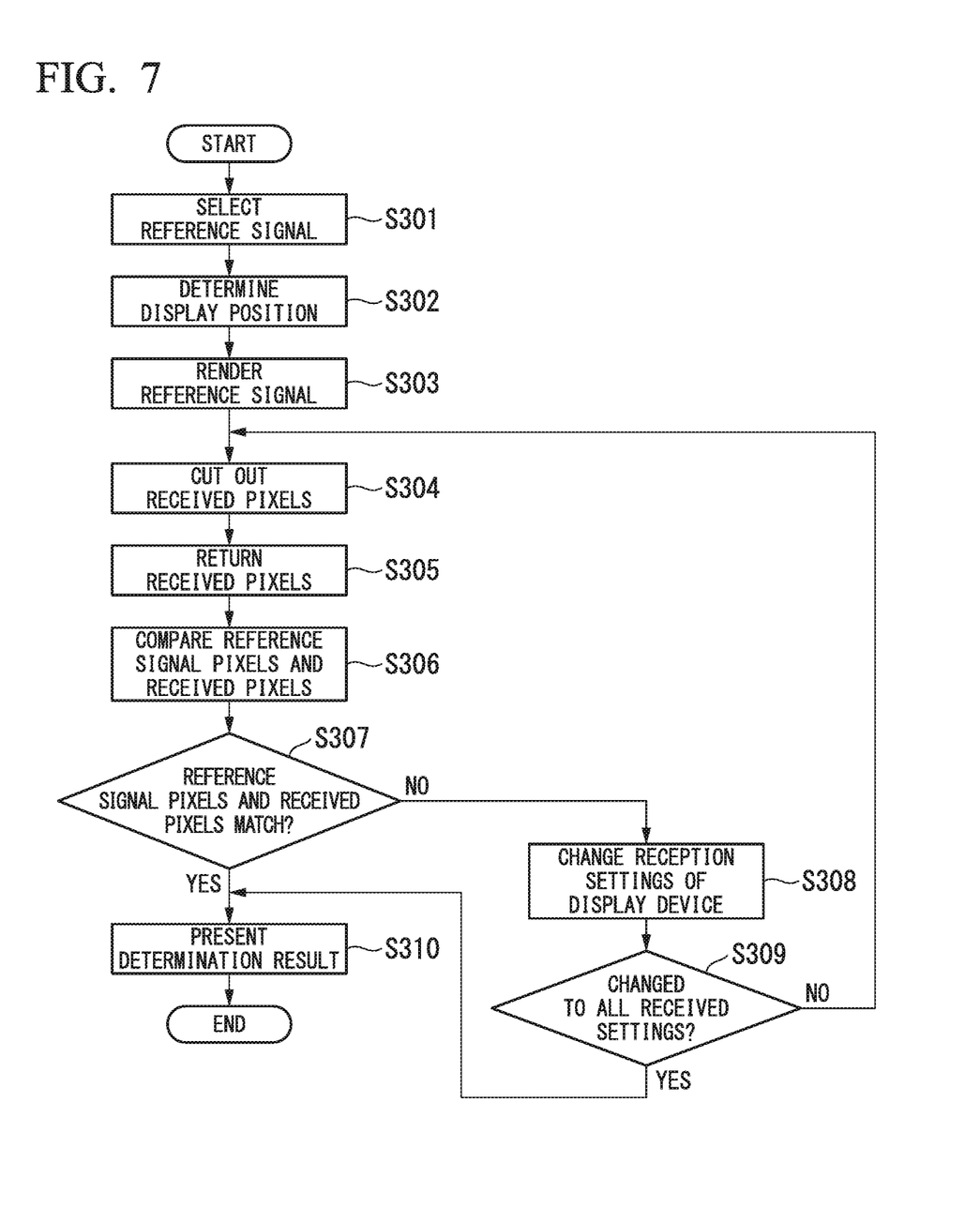
FIG. 7 is a flowchart showing an operation of a color diagnostic function in a self-diagnostic imaging system according to a third exemplary embodiment of the present invention.

Next, a third exemplary embodiment of the present invention will be described. FIG. 7 is a flowchart showing an operation of a color diagnostic function in a self-diagnostic imaging system according to a third exemplary embodiment of the present invention. The basic configuration of the third exemplary embodiment of the present invention is the same as that of the first and second exemplary embodiments described above.

(Step S301) Firstly, the reference signal rendering unit 51 presents to the user a color chart group (color chart) as an inspection target candidate, and the user uses the color chart group as the inspection target candidate to select a reference signal.

(Step S302) Then, the reference signal rendering unit 51 determines the vertical and horizontal coordinates inside the screen that contains the color chart group.

(Step S303) The display device 20 receives the reference signal from the image processing device 10. Then, the display device 20 performs decoding in the video decoding and input unit 61 up to an uncompressed RGB image having the same format as the color chart rendered by the reference signal, applies an image quality correction in the video display unit 63, and then displays the image on the display panel 21.

(Step S304) Furthermore, the display device 20 saves the RGB image of the image not yet subjected to correction, inside the RGB frame buffer 62. The image cut-out unit 64 receives the image cut-out position information transmitted from the image processing device 10, and reads the RGB image inside the RGB frame buffer 62, based on the position information thereof.

(Step S305) Next, the image cut-out unit 64 returns the RGB image data read from the RGB frame buffer 62 to the image processing device 10 via the USB connection terminal 23.

(Step S306) The input and output comparison unit 54 receives the RGB image received from the display device 20 and the reference signal RGB image from the reference signal rendering unit 51. Then, the input and output comparison unit 54 compares the gradation of the RGB image received from the display device 20 and the gradation of the reference signal RGB image one pixel at a time.

(Step S307) If the gradation of the RGB image received from the display device 20 and the gradation of the reference signal RGB image do not match (step S307: No), the processing proceeds to step S308, and if they match (step S307: Yes), the process proceeds to step S310.

(Step S308) The display device 20 switches reception settings (for example, a plurality of standard values exist in the YCrCb-RGB conversion matrix and signal level range) and the process proceeds to step S309.

(Step S309) The display device 20 determines whether it has been changed to all of the received settings. If it has not been changed to all of the received settings (Step S309: No), the process returns to Step S304 and the RGB image is received from the display device 20 again. If it has been changed to all of the received settings (step S309: Yes), the process proceeds to step S310.

(Step S310) The match and mismatch determination unit 55 presents the determination result to the user.

As described above, in the present exemplary embodiment, when the gradation of the RGB image received from the display device 20 and the gradation of the reference signal RGB image do not match, the reception setting of the display device 20 is switched and reception performed again, which enables the reception setting of the display device 20 to be modified such that it matches the reference signal.

Figure 8:
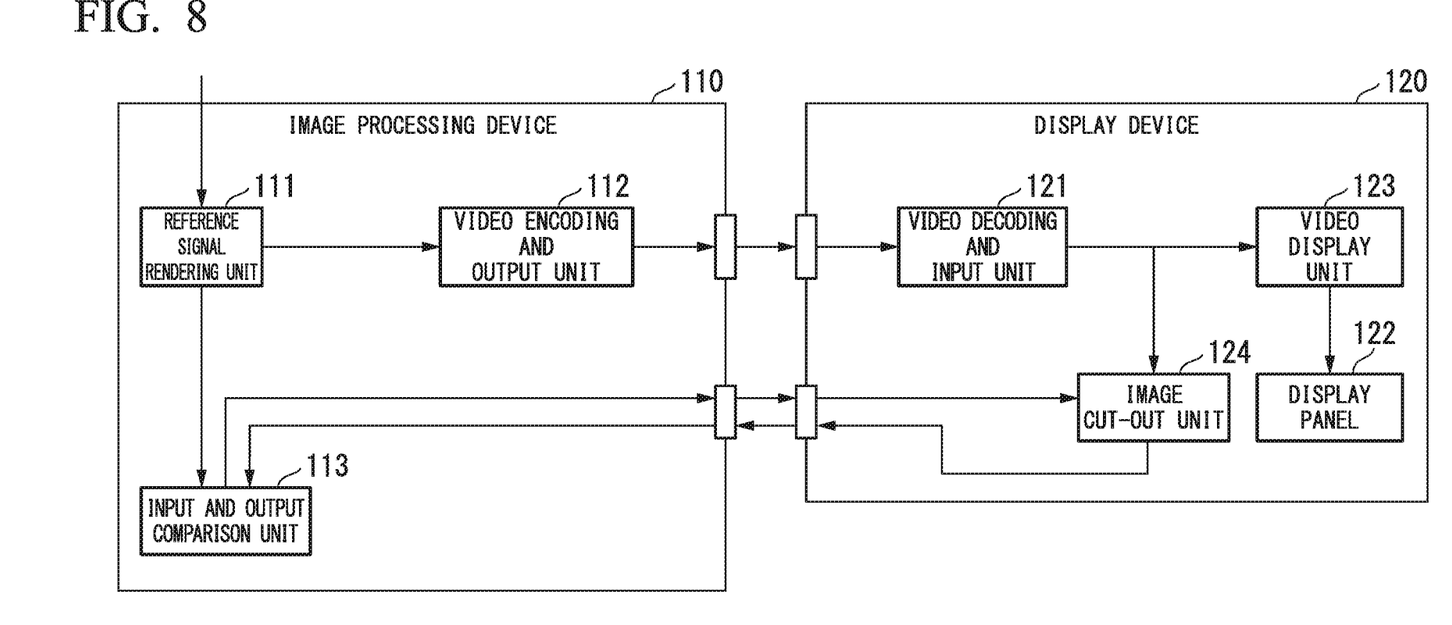
FIG. 8 is a schematic block diagram showing a basic configuration of the self-diagnostic imaging system according to the present invention.

FIG. 8 is a schematic block diagram showing a basic configuration of a self-diagnostic imaging system according to the present invention. The self-diagnostic imaging system according to the present invention comprises an image processing device 110 that generates a display image, and a display device 120 that displays the image generated by the image processing device 110.

The image processing device 110 has a basic configuration that includes a reference signal rendering unit 111, a video encoding and output unit 112, and an input and output comparison unit 113. The reference signal rendering unit 111 generates an image of a reference signal. The video encoding and output unit 112 encodes and outputs the image of the reference signal. The input and output comparison unit 113 compares the image returned from the display device and the image generated by the reference signal rendering unit.

The display device 120 has a basic configuration that includes a video decoding and input unit 121, a video display unit 123, and an image cut-out unit 124. The video decoding and input unit 121 decodes an input video signal. The video display unit 123 performs image quality correction of the decoded image, and displays the image on the display panel 122. The image cut-out unit 124 cuts out an image at a position corresponding to the reference signal from the image not yet subjected to image quality correction, and transmits the cut out image to the image processing device 110.

In the present invention, image self-diagnosis is performed by comparing the image returned from the display device 120 and the image generated by the reference signal rendering unit 111. As a result, it can be determined whether or not there is an erroneous setting in the display environment.

A program for realizing all or a portion of the functions of the display system 1 may be recorded in a computer-readable recording medium, and the processing of each unit may be performed by a computer system reading and executing the program recorded in the recording medium. The "computer system" referred to here includes an OS and hardware such as peripheral devices.

Furthermore, if the "computer system" uses a WWW system, it is assumed to include a website providing environment (or displaying environment).

Moreover, the "computer-readable recording medium" refers to a portable storage medium such as a flexible disk, a magneto-optical disk, a ROM, or a CD-ROM, or a recording device such as a hard disk built into the computer system. In addition, the "computer-readable recording medium" is assumed to include those that dynamically retain the program for a short time, such as a communication line that transmits the program via a network such as the Internet or a communication line such as a telephone line, and those that retain the program for a fixed time, such as the volatile memory inside a computer system serving as a server or a client in this case. The program described above may be one that realizes a portion of the functions mentioned above. Further, the program may be one capable of realizing the functions described above in combination with a program already recorded in the computer system.

Although exemplary embodiments of the present invention have been described above in detail with reference to the drawings, specific configurations are in no way limited to the exemplary embodiments, and design changes and the like within a scope not departing from the gist of the present invention are included.

REFERENCE SYMBOLS

1 Display system (self-diagnostic imaging system)
10 Image processing device
11 Input device
20 Display device
21 Display panel
51 Reference signal rendering unit
52 Video correction unit
53 Video encoding and output unit
54 Input and output comparison unit
55 Match and mismatch determination unit
61 Video decoding and input unit
62 RGB frame buffer
63 Video display unit
64 Image cut-out unit

The invention claimed is:

1. A self-diagnostic imaging method for a self-diagnostic imaging system, the self-diagnostic imaging system comprising: an image processing device that generates a display image; and a display device that displays the image generated by the image processing device, the method comprising:

generating, by the image processing device, an image of a reference signal;

encoding, by the image processing device, the image of the reference signal;

decoding, by the display device, the encoded image;

performing, by the display device, image quality correction of the decoded image;

displaying, by the display device, the image to which the image quality correction has been performed, on a display panel;

cutting out, by the display device, an image at a position corresponding to the reference signal from an image to which the image quality correction has not been performed;

transmitting, by the display device, the cut out image to the image processing device; and performing, by the image processing device, image diagnosis by comparing the image of the reference signal with the cut out image to which the image quality correction has not been performed, wherein the performing the image diagnosis comprises comparing, one pixel at a time, the image of the reference signal with the decoded image to which the image quality correction has not been performed.

2. The self-diagnostic imaging method according to claim 1, wherein the performing the image diagnosis comprises comparing a color characteristics of the image of the reference signal with a color characteristics of the decoded image to which the image quality correction has not been performed, and determining that there is a malfunction in the image processing device in a case where the color characteristics of the image of the reference signal and the color characteristics of the cut out image to which the image quality correction has not been performed are different from each other.

3. The self-diagnostic imaging method according to claim 1, wherein the performing the image diagnosis comprises comparing, one pixel at a time, a gradation of the image of the reference signal with a gradation the cut out image to which the image quality correction has not been performed, and determining that there is a setting error in the image processing device in a case where the gradation of the image of the reference signal and the gradation of the cut out image to which the image quality correction has not been performed are different from each other.

4. The self-diagnostic imaging method according to claim 1, further comprising:

changing a reception setting of the display device in a case where the image of the reference signal and the cut out image to which the image quality correction has not been performed are different from each other.

5. The self-diagnostic imaging method according to claim 1, wherein a color chart group is generated as the reference signal.

6. The self-diagnostic imaging method according to claim 5, wherein the color chart group generated as the reference signal is selectable by a user.

7. The self-diagnostic imaging method according to claim 1, wherein the encoding comprises encoding, by the image processing device, an RGB image generated as the reference signal into a YCrCb image, and
the decoding comprises decoding, by the display device, the YCrCb image to obtain an RGB image.

8. The self-diagnostic imaging method according to claim 7, wherein the performing the image diagnosis includes comparing, by the image processing device, the obtained RGB image with the RGB image generated as the reference signal, one pixel at a time.

9. The self-diagnostic imaging method according to claim 1, further comprising:
displaying, on the display device, a guide indicating a display position of the image of the reference signal.

10. The self-diagnostic imaging method according to claim 9, further comprising:
adjusting the display position of the image of the reference signal so as to be matched with the guide.

11. The self-diagnostic imaging method according to claim 1, wherein the performing the image diagnosis comprises comparing a color characteristics of the image of the reference signal with a color characteristics of the decoded image to which the image quality correction has not been performed.

12. The self-diagnostic imaging method according to claim 1, wherein the performing the image diagnosis comprises determining that there is a malfunction in the image processing device in a case where a color characteristics of the image of the reference signal and a color characteristics of the cut out image to which the image quality correction has not been performed are different from each other.

13. The self-diagnostic imaging method according to claim 1, wherein the performing the image diagnosis comprises comparing a color characteristics of the image of the reference signal with a color characteristics of the cut out image to which the image quality correction has not been performed.

14. The self-diagnostic imaging method according to claim 1, wherein the performing the image diagnosis comprises determining that there is a setting error in the image processing device in a case where a color characteristics of the image of the reference signal and a color characteristics of the cut out image to which the image quality correction has not been performed are different from each other.

15. The self-diagnostic imaging method according to claim 1, wherein the performing the image diagnosis comprises comparing a gradation of the image of the reference signal with a gradation of the decoded image to which the image quality correction has not been performed.

16. The self-diagnostic imaging method according to claim 1, wherein the performing the image diagnosis comprises determining that there is a malfunction in the image processing device in a case where a gradation of the image of the reference signal and a gradation of the cut out image to which the image quality correction has not been performed are different from each other.

17. The self-diagnostic imaging method according to claim 1, wherein the performing the image diagnosis comprises comparing a gradation of the image of the reference signal with a gradation of the cut out image to which the image quality correction has not been performed.

18. A non-transitory computer-readable recoding medium storing a self-diagnostic imaging program for a self-diagnostic imaging system, the self-diagnostic imaging system comprising an image processing device that generates a display image and a display device that displays an image generated by the image processing device, the program comprising:
causing the image processing device to generate an image of a reference signal;
causing the image processing device to encode the image of the reference signal;
causing the display device to decode the encoded image;
causing the display device to perform image quality correction of the decoded image;
causing the display device to display the image to which the image quality correction has been performed, on a display panel;
causing the display device to cut out an image to which the image quality correction has not been performed;
causing the display device to transmit the cut out image to the image processing device; and
causing the image processing device to perform image diagnosis by comparing the image of the reference signal with the cut out image to which the image quality correction has not been performed,
wherein the performing the image diagnosis comprises comparing, one pixel at a time, the image of the reference signal with the decoded image to which the image quality correction has not been performed.

19. A display device for displaying an image generated by an image processing device, the display device comprising:
a video decoding and input unit that receives an encoded image of a reference signal generated by the image processing device, and decodes the encoded image;
a video display unit that performs image quality correction of the decoded image and displays, on a display panel, the image to which the image quality correction has been performed; and
an image cut-out unit that cuts out an image at a position corresponding to the reference signal from an image to which the image quality correction has not been performed and transmits the cut out image to which the image quality correction has been performed, to the image processing device,
wherein the image cut-out unit compares, one pixel at a time, the image of the reference signal with the decoded image to which the image quality correction has not been performed.

20. A self-diagnostic imaging system comprising an image processing device that generates a display image and a display device that displays an image generated by the image processing device, wherein the image processing device comprises:
a reference signal rendering unit that generates an image of a reference signal; and
a video encoding and output unit that encodes the image of the reference signal; and
an input and output comparison unit that compares an image transmitted from the display device with the image generated by the reference signal rendering unit, and
the display device comprises:
a video decoding and input unit that decodes the encoded image;

a video display unit that performs image quality correction of the decoded image and displays, on a display panel, the image to which the image quality correction has been performed; and an image cut-out unit that cuts out an image at a position corresponding to the reference signal from an image to which the image quality correction has not been performed, and transmits the cut out image to which the image quality correction has been performed, to the image processing device, wherein the image cut-out unit compares, one pixel at a time, the image of the reference signal with the decoded image to which the image quality correction has not been performed.

\* \* \* \* \*